United States Patent [19]

Saito

[11] 4,308,144
[45] Dec. 29, 1981

[54] PREVENTION OF FLOW REVERSAL IN VERTICAL WASTE TREATMENT APPARATUS

[75] Inventor: Thomas I. Saito, West Hill, Canada

[73] Assignee: Eco-Research Limited, Montreal, Canada

[21] Appl. No.: 139,830

[22] Filed: Apr. 14, 1980

Related U.S. Application Data

[63] Continuation-in-part of Ser. No. 8,184, Jan. 31, 1979, abandoned.

[30] Foreign Application Priority Data

Mar. 14, 1978 [CA] Canada ................................ 298879

[51] Int. Cl.³ .............................................. E02B 3/06
[52] U.S. Cl. ..................... 210/620; 210/136; 210/220
[58] Field of Search .................. 210/15, 16, 100, 117, 210/136, 198 R, 220, 620; 261/65, DIG. 75, 121 R

[56] References Cited

U.S. PATENT DOCUMENTS

3,701,425 10/1972 Laval, Jr. ............................ 210/136
3,758,083 9/1973 Palmer ............................ 210/136 X

FOREIGN PATENT DOCUMENTS

1086105 2/1955 France ................................ 210/220
19915 of 1913 United Kingdom ................ 210/220

*Primary Examiner*—Frank A. Spear, Jr.
*Attorney, Agent, or Firm*—Donald G. Ballantyne

[57] ABSTRACT

In a long vertical shaft sewage circulation waste treatment process where influent waste is introduced into the shaft through a downcomer conduit, an improvement is provided whereby the downcomer conduit, because of its flexible construction, is made to collapse by the application of external pressure from surrounding fluid waste in the shaft. Such collapse acts as a check valve which pinches closed the influent conduit and prevents reversal of flow in the circulation system. External pressure collapse of the flexible conduit is produced by a pressure differential between influent within the conduit and the surrounding fluid waste caused, for example, by flow interruption or power failure. The need to employ mechanical check valves, which are subject to malfunction, is eliminated.

1 Claim, 1 Drawing Figure

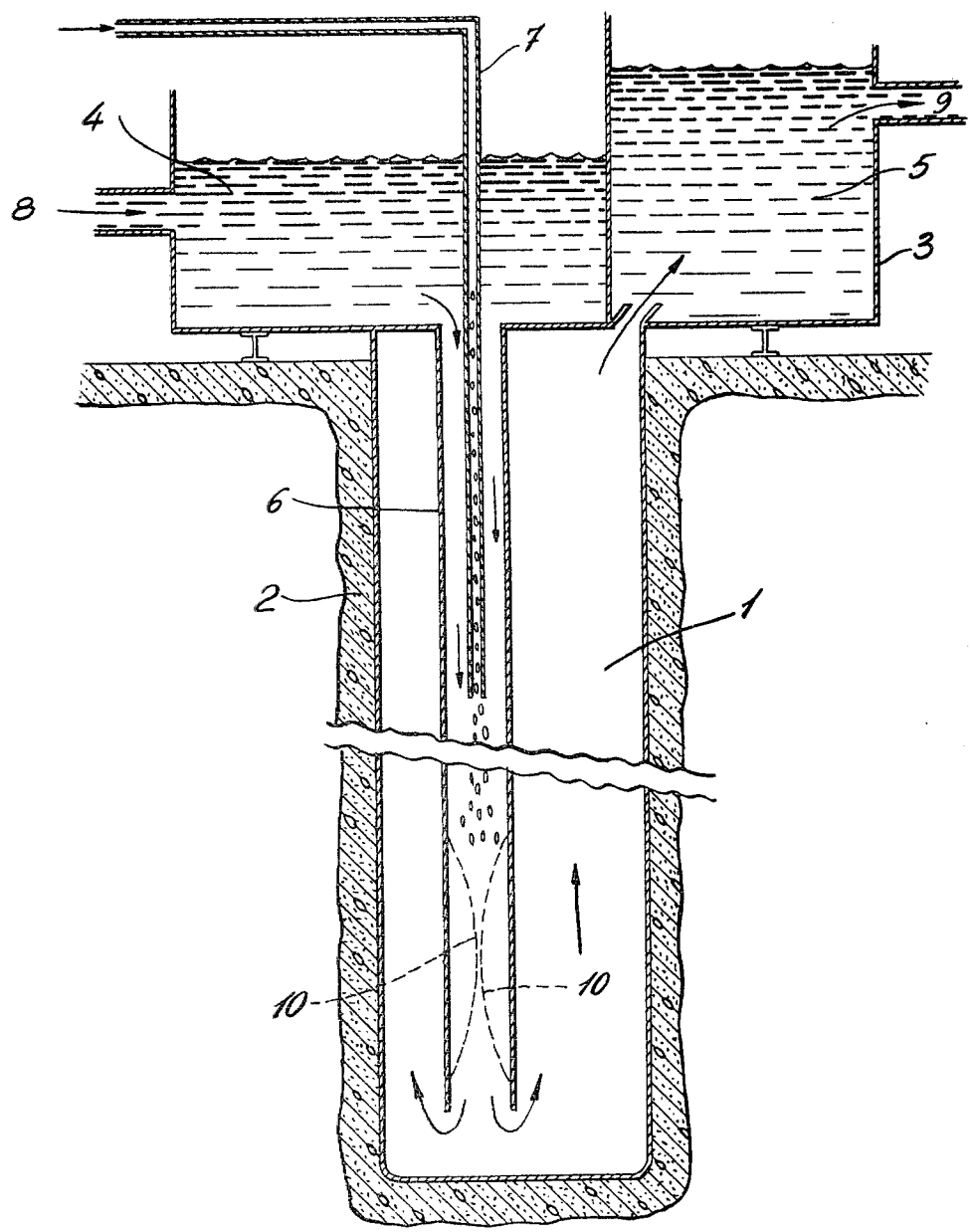

PREVENTION OF FLOW REVERSAL IN VERTICAL WASTE TREATMENT APPARATUS

This application is a Continuation-in-Part application of United States application Ser. No. 008,184 filed on Jan. 31, 1979, now abandoned.

In British Patent Specification No. 1,473,665, published Apr. 6th, 1977, there is disclosed a system for the treatment of biologically-degradable waste matter. The disclosed system comprises a long vertical shaft sewage circulation apparatus consisting of a downcomer conduit or chamber and a riser conduit or chamber communicating with each other at their upper ends through a head tank and at their lower ends through the riser chamber itself. An oxygen-containing gas is added to the circulating sewage as it is passed downward through the downcomer. In the disclosed system the riser and downcomer conduits or chambers are preferably located in a below-ground level vertical shaft extending to a depth of forty or more meters below the surface.

In the system described, sewage, after primary treatment and gas-disengagement, is directed from a head tank or basin into the downcomer where it passes downward aided by a circulation means. An oxygen-containing gas, preferably air, is injected into the sewage at a point below ground level, which air injection provides the necessary environment for biodegradation of the sewage waste. The injected air also provides some or all of the circulation force required for moving the sewage around the system. As the sewage is circulated down the downcomer and then upward through the riser, it is aerated and digested and the resultant stabilized effluent is collected in a suitable chamber or tank associated with the top of the riser conduit.

A suitable apparatus for operation of the disclosed method comprises a deep vertical shaft or borehole drilled into the ground having a diameter of one or more meters and being lined with a steel casing or grouted with concrete. A single downcomer conduit, normally a pipe of a corrosion and abrasion-resistant material such as steel or rigid plastic, is placed in the vertical shaft and extends nearly to its full depth. The riser conduit or chamber comprises the annular space between the walls of the lined vertical shaft and the exterior of the downcomer pipe or conduit.

Several problems have arisen with respect to the above-described apparatus and its operation. Because of the substantial depth of the vertical shaft, it has been necessary to construct the downcomer conduit or pipe from short pipe sections connected together end-to-end. When rigid plastic pipe sections are employed, the connections between the sections are made by employing vertical fusion welding techniques, which techniques have not always provided a downcomer pipe of adequate strength and resistance. When steel pipe sections are employed, difficulties are experienced in supporting the increasingly heavy length of pipe while the sections are connected by welding or bolting.

During operation of the system, when the sewage is being circulated by the force or pressure of introduced air, any failure in the power supply results in an interruption in the circulation of the sewage waste. Because of a pressure differential between downcomer (high pressure) and riser (lower pressure) chambers, the normal downward direction of flow of the sewage in the downcomer reverses during a power interruption or loss of air pressure causing an upward flow in the downcomer. Due to the physical and chemical nature of the sewage waste, it has not been possible to provide any reliable one-way or check valve in the downcomer suitable for use in this environment to control such a reversal of flow.

It has now been found that the aforementioned deficiencies and difficulties may be overcome by providing a downcomer conduit for a deep vertical shaft waste circulation apparatus which comprises a resilient, flexible pipe which is adapted to maintain an open flow therethrough at the operating pressure of the system but which will collapse and seal or pinch-close against the flow of sewage during any reduction in operating pressure. A method is therefore provided to prevent a reversal of the direction of fluid flow which comprises restricting the size of the internal passageway of the downcomer conduit by collapsing the said downcomer by the application of external pressure thereto, the downcomer being so constructed that it is inwardly collapsible in response to excess pressure exerted against its outer surface by the surrounding fluid.

The present invention may be more readily understood by referring to the accompanying drawing which shows in cut-away section a typical in-the-ground waste treatment arrangement employing a flexible or collapsible downcomer conduit.

Referring to the drawing there is shown a deep in-the-ground shaft 1 surrounded by grouting material 2. Supported above shaft 1 is head tank 3 which is divided into influent tank 4 and effluent tank 5. Attached to the base of influent tank 4 and extending nearly to the bottom of shaft 1 is flexible collapsible downcomer conduit 6. Air line 7, through which pressurized air is added to the influent as it passes through downcomer 6 is shown extending to a substantial depth in downcomer 6.

In operation, influent waste material such as municipal sewage is introduced into tank 4 in the direction of arrow 8. The influent passes downward through downcomer 6, where it exits to rise and fill shaft 1 acting as a riser chamber. That portion of the waste which has degraded biologically rises to the surface in tank 5 as a floating effluent. The effluent is withdrawn from tank 5 in the direction of arrow 9. Pressurized air, added to the waste in downcomer 6 through airline 7, aids in maintaining circulation of the waste through the system as well as adding essential oxygen for the biological degradation of the waste. Once in circulatory operation, the system operates at a positive pressure, which pressure is maintained at an equilibrium within and without downcomer 6. In the event of loss of pressurized air in line 7 (in, for example a power failure) pressure within downcomer 6 becomes reduced compared to pressure in the rest of the system. This results in a reversal of flow upward in downcomer 6 and causes an eruption of waste from the surface of head tank 4. However, due to the resiliency of the material comprising downcomer 6, the downcomer is collapsed inward as soon as a pressure differential is created between the downcomer and riser. Such collapse as shown by dashed line 10, effectively pinches closed the downcomer 6 and prevents reversal of flow of waste towards influent tank 4.

The material of construction of downcomer conduit 6 may be of any suitable natural or synthetic material possessing the necessary resistance to chemical attack within the system and having flexibility characteristics which permit inward pinching or collapse upon the application of pressure against the outside walls thereof.

Suitable materials are, for example, high carbon content rubber, polytetrafluoroethylene, or polychloroprene or mixtures of these. Particularly suitable is a fibre or fabric-reinforced material comprising polyester reinforcing fabric or fibres embedded within a rubber tubing. The thickness of the wall of the tubing or conduit will be selected on the basis of the designed operating conditions of the system, and will be such to maintain adequate rigidity to function as a waste conductor within the shaft yet possess sufficient flexibility to be collapsible upon the application of external pressure.

EXAMPLE

In a typical installation in the field where a shaft having a diameter of 76.2 cm and a depth of 152.4 meters was constructed for the biological degradation of municipal industrial waste, a downcomer was provided which consisted of a 146.3 meter continuous length of HYPOLON (Registered Trade mark) rubber pipe having a diameter of 48.3 cm. Prior to delivery to the site, one end of the downcomer was weighted with a metal ring plate to act as a sinker during lowering into the shaft. The opposite upper end of the downcomer was connected to a three-foot length of steel pipe which steel pipe was adapted for connection to a head tank at top of the shaft. The prepared downcomer was rolled onto a drum mandrel and delivered to the field site by truck. At the site, the downcomer pipe was unrolled and lowered, weighted end first, into the water-filled shaft. The water in the shaft prevented any additional load stress on the downcomer and reduced stretching. When fully extended, the upper steel-pipe end of the downcomer was connected to the head tank. After installation, an air sparger line was placed inside the downcomer and the system was then ready to receive the influent waste material.

After the system had been started up in the treatment of municipal waste and was running in a normal operational mode, the operation of the system and circulation of waste was deliberately stalled by unduly reducing the volume of process air being delivered to the system. In a period of about eleven minutes the normal flow direction of the waste (down the downcomer and up to riser) was arrested and a gentle reverse flow condition began causing a rise in liquid level in the head tank connected to the downcomer. This rise in liquid lasted one minute and then begun to fall back to a level below the overflow of the head tank where it remained steady. At no time during the test was any geyser effect experienced and no reverse flow down the riser chamber was observed.

The improved downcomer conduit of the present invention provides the advantages of a single, continuous length devoid of any mechanical or fusion joints, lightness of weight resulting in economic installation and cost, and flexibility and collapsibility thus eliminating the need for the use of mechanical check valves to prevent flow reversal during loss of system pressure.

What we claim is:

1. In a modified activated sludge waste treatment method wherein an aerobic biological reaction takes place during the continuous circulation of fluid waste in a long vertical shaft treatment apparatus including a fluid waste receiving basin, a long vertical downcomer conduit connected to said receiving basin, a long vertical riser conduit surrounding said downcomer conduit with an axial fluid space therebetween, the said riser and downcomer conduits communicating with each other at their lower ends so as to permit undirectional continuous circulation of fluid waste through said conduits, and air injection means to provide oxygen to the said waste as it passes through the said dowcomer conduit, an improvement in said method whereby a potential reversal in the direction of fluid flow in the said apparatus is prevented, said improvement comprising the step of restricting the size of the internal cross-section of the said downcomer conduit at any point along its length to limit the passage of fluid therethrough by collapsing the said downcomer conduit through the application of pressure against the outside wall thereof, the said downcomer conduit being flexibly inwardly collapsible in response to excess pressure exerted by the surrounding fluid in axial space between the said riser and downcomer conduits.

* * * * *